United States Patent
Takahashi et al.

(10) Patent No.: US 7,719,796 B2
(45) Date of Patent: May 18, 2010

(54) SUSPENSION FOR HARD DISK DRIVE WHICH ENABLES EASY DYNAMIC ELECTRIC TESTING

(75) Inventors: Haruhide Takahashi, Kanagawa-ken (JP); Kousaku Wakatsuki, Kanagawa-ken (JP); Shinobu Hagiya, Kanagawa-ken (JP); Takayoshi Ohtsu, Kanagawa (JP); Kouji Kataoka, Kanagawa (JP); Yohtaroh Ichimura, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 823 days.

(21) Appl. No.: 11/480,040

(22) Filed: Jun. 30, 2006

(65) Prior Publication Data

US 2007/0002494 A1    Jan. 4, 2007

(30) Foreign Application Priority Data

Jun. 30, 2005    (JP) .............................. 2005-191516

(51) Int. Cl.
*G11B 21/21* (2006.01)
(52) U.S. Cl. .................................. 360/244.8
(58) Field of Classification Search .................. None
See application file for complete search history.

(56) References Cited

U.S. PATENT DOCUMENTS

| | | | |
|---|---|---|---|
| 6,459,260 B1 * | 10/2002 | Bonin et al. | 324/158.1 |
| 6,903,543 B2 * | 6/2005 | Boutaghou et al. | 324/158.1 |
| 7,497,006 B2 * | 3/2009 | Davis et al. | 29/603.06 |
| 2004/0036994 A1 | 2/2004 | Kainuma et al. | |

FOREIGN PATENT DOCUMENTS

| | | |
|---|---|---|
| JP | 2002-050017 | 2/2002 |
| JP | 2002-150734 | 5/2002 |

* cited by examiner

*Primary Examiner*—Mark Blouin
(74) *Attorney, Agent, or Firm*—Townsend and Townsend and Crew LLP; John Henkhaus (57) ABSTRACT

In a dynamic electric test, a head slider is to be fixed positively to a suspension and to be removable easily from the suspension in accordance with the result of the test. In one embodiment of the present invention a head gimbal assembly includes a head slider, a gimbal and a load beam. The head slider is disposed on a gimbal tongue and is held with an urging force of a resilient clamp at a position between the resilient clamp formed on the leading side of the head slider and connecting terminals formed on the opposite side thereof.

18 Claims, 8 Drawing Sheets

SUSPENSION FOR HARD DISK DRIVE WHICH ENABLES EASY DYNAMIC ELECTRIC TESTING

CROSS-REFERENCES TO RELATED APPLICATIONS

This application claims priority from Japanese Patent Application No. JP2005-191516, filed Jun. 30, 2005, the entire disclosure of which is incorporated herein by reference.

BACKGROUND OF THE INVENTION

The present invention relates to a suspension, a head gimbal assembly, and a method of manufacturing a head gimbal assembly. In particular, the present invention is concerned with holding a head slider on a suspension.

Data storage devices using various types of media such as optical disks and magnetic tapes are known in the art. Among them, hard disk drives (hereinafter referred to as HDDs) have become popular as storage devices for computers to such an extent that they are one type of the storage devices indispensable for today's computers. Further, not limited to computer systems, HDDs are expanding more and more in application because of their excellent characteristics. For example, HDDs are used for moving picture recording/reproducing devices, car navigation systems, cellular phones, and removable memories for use in digital cameras.

The HDD includes a magnetic disk for storing data and a head slider for making access to the magnetic disk. The head slider includes a head element portion which reads and/or writes data from and/or to the magnetic disk and a slider with the head element portion formed thereon. The head element portion includes a write element which converts an electric signal to a magnetic field in accordance with data written to the magnetic disk and/or a read element which converts a magnetic field provided from the magnetic disk into an electric signal. The HDD further includes an actuator for moving the head slider to a desired position over the magnetic disk. The actuator is driven by a voice coil motor (VCM) and pivots about a pivot shaft to move the head slider radially over the rotating magnetic disk. Thus, the head element portion makes access to a desired track formed on the magnetic disk, whereby it is possible to perform data read/write processing.

The actuator includes an elastic suspension and the head slider is fixed to the suspension with an adhesive. Pressure based on the viscosity of air present between an ABS (Air Bearing Surface) of the head opposed to the magnetic disk and the rotating magnetic disk counteracts pressure applied in the direction of the magnetic disk by the suspension. This enables the head to fly over the magnetic disk at a certain gap.

Figure 8:
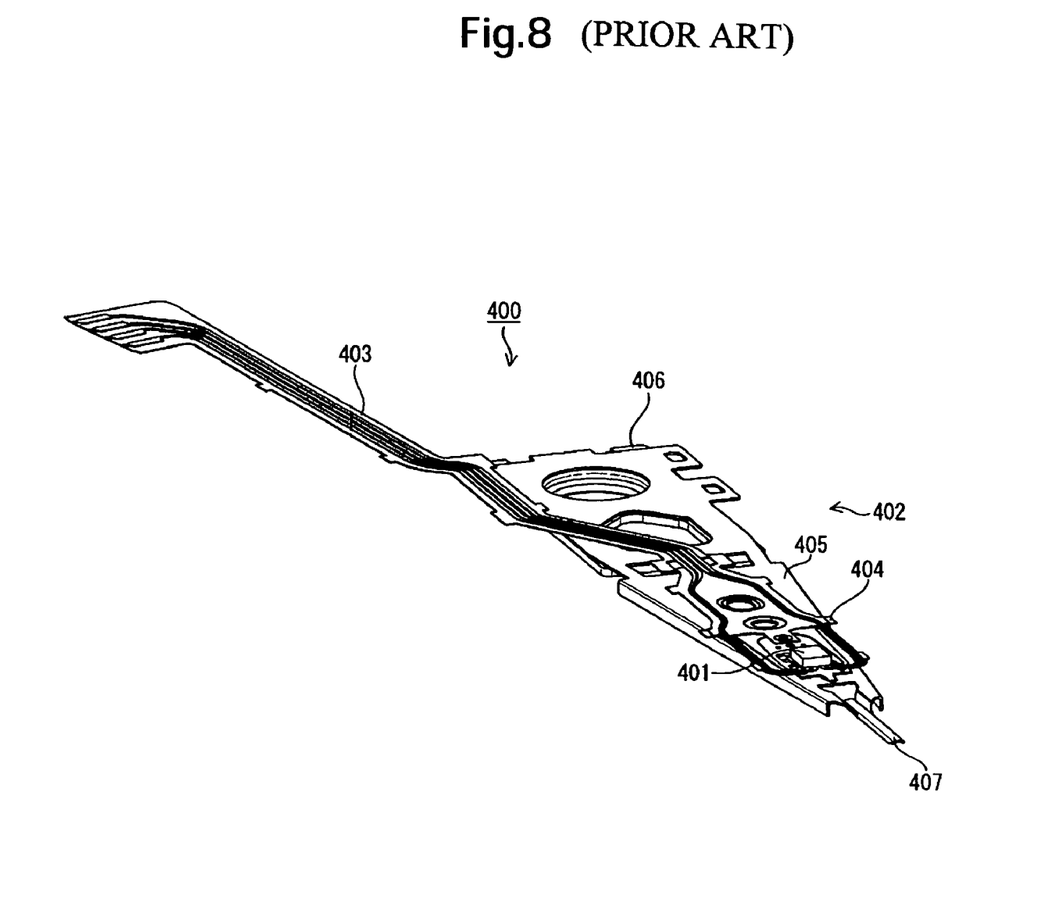
FIG. 8 is a perspective view schematically showing the construction of a head gimbal assembly according to the prior art.

An assembly of the head slider and the suspension is designated as a head gimbal assembly (HGA). FIG. 8 shows an HGA by way of example as viewed from the recording surface side of the magnetic disk. As shown in FIG. 8, the HGA 400 includes a head slider 401, a suspension 402 and a trace 403 as transmission wiring. The suspension 402 includes flexible gimbals 404 which holds the head slider 401 on the side opposed to the magnetic disk, as well as a load beam 405 and a mounting plate 406 both holding the head slider 401 on the side opposed to the magnetic disk. The illustrated HGA 400 is of a load/unload type and is provided at a front end of the load beam 405 with a tab 407 for unloading to a ramp mechanism. The head slider 401 is formed at its front surface (on the tab side) with plural terminals connected to the head element portion. Those terminals and the wiring lines of the trace 403 are connected together, for example, by soldering or gold ball bonding.

The manufacture of an HGA involves a test called a dynamic electric test (DET). In the DET, an HGA is set in a testing device, actual read/write processing is performed on a rotating magnetic disk, and then the head slider is evaluated for flying characteristics and read/write characteristics. An HGA that satisfies required specifications in the DET advances to the next manufacturing step, while an HGA regarded as rejection is discharged to waste. Thus, when the head slider does not satisfy the required specifications, the suspension with the head slider fixed thereto is also discharged to waste, which is a loss in the manufacture of the HGA.

To eliminate such a loss of the suspension in the HGA manufacture, a DET device has been proposed which permits mounting and removal of the head slider (see, for example, Patent Literature 1: Japanese Patent Laid-open No. 2004-86976). By using such a testing device for the head slider alone, it is possible to conduct the DET before mounting of the head slider onto the suspension and hence to prevent a loss of the suspension caused by the defective head slider.

In addition, a technique has been proposed which improves the adhesive for fixing the head slider to the suspension and thereby permits removal of a defective head slider from the suspension (see, for example, Patent Literature 2: Japanese Patent Laid-open No. 2002-150734). The DET evaluates the head slider for characteristics in the state of the HGA. The adhesive is in a state of gel at low temperatures, assumes a melted state at high temperatures and is cured at still higher temperatures. The head slider and the suspension are fixed together temporarily with the adhesive that is in a state of gel. In this state, the DET is performed. If the head slider is defective, the adhesive is heated into a melted state, in which the head slider is removed from the suspension. If the head slider satisfies the required specifications, the adhesive is cured by heating to effect an external connection between the head slider and the suspension.

BRIEF SUMMARY OF THE INVENTION

According to the testing device used exclusive for the head slider, it is difficult to perform the DET under just the same conditions as those for the HGA. As recording density is increased, the track pitch is narrowed and the head slider is miniaturized, it is required to conduct the DET under conditions closer to the actual state of use. It is difficult for a testing device which does not use the ordinary suspension to test the head slider to meet such a requirement. In particular, since the ordinary suspension applicable to the HDD product is not used, it is difficult to make an off-track measurement at high speed. Moreover, if a special adhesive as referred to above is used, a complicated heat treatment is required for the mounting and removal of the head slider. Further, the temporary fixing with the gel-like adhesive does not always afford sufficient strength, whereby it is possible that the head slider shifts from a desired position.

The present invention has been accomplished with such circumstances as background. It is a feature of the preset invention to make it possible to fix a head slider to a suspension positively in a DET and remove the head slider from a suspension easily in accordance with the result of the test.

In a first aspect of the present invention there is provided a suspension for holding a head slider having a head element portion and adapted to fly over a rotating medium, the suspension comprising a load beam for applying to the head slider a force which counteracts a lifting force of the head slider, and a flexible gimbal fixed onto a surface of the load beam, the flexible gimbal including a tongue for disposing the head slider thereon and a resilient clamp for urging and holding the head slider on the tongue. By urging and holding the head slider with use of the resilient clamp, it becomes possible, for example in a DET, to fix the head slider to the suspension positively and remove the head slider from the suspension easily in accordance with the result of the test.

In a second aspect of the present invention, in combination with the above first aspect, the clamp confronts and abuts a leading-side surface of the head slider and applies an urging force to the head slider. According to this construction, the clamp can be formed without increasing the width of the suspension.

In a third aspect of the present invention, in combination with the above second aspect, the clamp is formed by bending a portion extending from the tongue on the leading side of the head slider. According to this construction, the clamp can be formed easily without an increase in the number of components.

In a fourth aspect of the present invention, in combination with the above second aspect, the gimbal includes, on the side opposite to the clamp, a connecting terminal which is in contact with a terminal of the head slider to connect transmission wiring and the terminal. Since the connecting terminal lies on the side opposite to the clamp, it is possible to form the clamp more easily.

In a fifth aspect of the present invention, in combination with the above fourth aspect, the connecting terminal comes into abutment against the terminal of the head slider to position the head slider on the tongue. With such a simple construction, it is possible to hold and position the head slider.

In a sixth aspect of the present invention, in combination with the above fourth aspect, the gimbal includes, on the side opposite to the clamp and separately from the head slider, a stopper which comes into abutment against the head slider to position the head slider. According to this construction it is possible to suppress wear of the connecting terminal.

In a seventh aspect of the present invention there is provided a head gimbal assembly comprising a head slider including a head element portion, a flexible gimbal, the flexible gimbal including a tongue on which the head slider is disposed and a resilient clamp for urging and holding the head slider on the tongue, and a load beam which holds the gimbal on the side opposite to the head slider. According to this construction, the head slider is urged and held with the use of a resilient clamp, so for example in a DET, it is possible to fix the head slider to the suspension positively and remove the head slider from the suspension easily in accordance with the result of the test.

In an eighth aspect of the present invention, in combination with the seventh aspect, the clamp confronts and abuts a side face of the head slider which side face extends in a transverse direction of a suspension, and imparts an urging force to the head slider. According to this construction it is possible to form the clamp without increasing the width of the suspension.

In a ninth aspect of the present invention, in combination with the above eighth aspect, the clamp confronts and abuts a leading-side surface of the head slider and applies an urging force to the head slider. According to this construction it is possible to form the clamp in a desired shape easily without increasing the width of the suspension.

In a tenth aspect of the present invention, in combination with the above ninth aspect, the clamp is formed by bending a portion extending from the tongue on the leading-side of the head slider. According to this construction it is possible to form the clamp easily without an increase in the number of components.

In an eleventh aspect of the present invention, in combination with the ninth aspect, the gimbal includes, on the side opposite to the clamp, a connecting terminal connected to transmission wiring and coming into contact with a terminal of the head slider. Since the connecting terminal lies on the side opposite to the clamp, the clamp can be formed more easily.

In a twelfth aspect of the present invention, in combination with the eleventh aspect, the connecting terminal comes into abutment against the terminal of the head slider to position the head slider. With such a simple construction, it is possible to hold and position the head slider.

In a thirteenth aspect of the present invention, in combination with the above eleventh aspect, the gimbal includes, on the side opposite to the clamp and separately from the connecting terminal, a stopper which comes into abutment against the head slider to position the head slider. According to this construction it is possible to suppress wear of the connecting terminal.

In a fourteenth aspect of the present invention, in combination with the above eighth aspect, the head gimbal assembly further comprises an adhesive layer formed between the head slider and the tongue. According to this construction, at a stage where the removal of the head slider becomes unnecessary, it is possible to hold the head slider more positively.

In a fifteenth aspect of the present invention, in combination with the above eleventh aspect, the head gimbal assembly further comprises a conductor layer for fixing the terminal of the head slider to the connecting terminal. According to this construction, an electric connection of the head slider can be further ensured at a stage where the removal of the head slider becomes unnecessary.

In a sixteenth aspect of the present invention there is provided a method of manufacturing a head gimbal assembly comprising a head slider provided with a head element portion and a suspension for holding the head slider, the method comprising the steps of providing a suspension comprising a load beam and a flexible gimbal fixed onto the load beam, disposing a head slider onto a tongue surface of the gimbal and urging and holding the head slider on the tongue surface with use of a resilient clamp formed in the gimbal, making access to a rotating medium through the head slider held by the suspension, thereby testing electrical characteristics of the head slider, and removing the head slider if proved to be defective from the suspension and disposing a new head slider on the suspension.

In a seventeenth aspect of the present invention, in combination with the above sixteenth aspect, if the result of the test of the head slider is good, the head slider and the tongue of the gimbal are fixed together using an adhesive. According to this construction, the head slider and the tongue can be connected to each other firmly when the head slider is mounted to a product.

In an eighteenth aspect of the present invention, in combination with the above sixteenth aspect, if the result of the test of the head slider is good, a terminal of the head slider and a connecting terminal of the suspension are fixed together using a conductor. According to this construction, an electrical contact of the connection can be made strong in mounting to a product.

A method of manufacturing a head gimbal assembly in a nineteenth aspect of the present invention, wherein if the result of the test of the head slider is good, the head slider is removed from the suspension and is mounted on another suspension product. According to this construction, it is possible in the test to fix the head slider positively and replace a defective head slider easily without discharging the suspension to waste.

According to the present invention, for example in a DET, the head slider can be fixed positively to the suspension and, in accordance with the result of the test, the head slider can be removed easily from the suspension.

DETAILED DESCRIPTION OF THE INVENTION

Specific embodiments of the present invention will be described below. In the drawings, the same elements are identified by the same reference numerals and tautological descriptions are omitted as appropriate. This embodiment relates to a head slider holding technique in a dynamic electric test (DET) for the head slider. In the DET adopted in this embodiment, the head slider is mounted to a suspension which is employable in a hard disk drive (HDD) as a product, and then the test is performed in this state for evaluation of the characteristics thereof. A feature of this embodiment resides in a head slider holding mechanism of the suspension. In this specification an assembly of the suspension and the head slider is designated as a head gimbal assembly (HGA). If the evaluation result of the DET satisfies desired specifications, the tested HGA is mounted to a HDD as a product.

Figure 1:
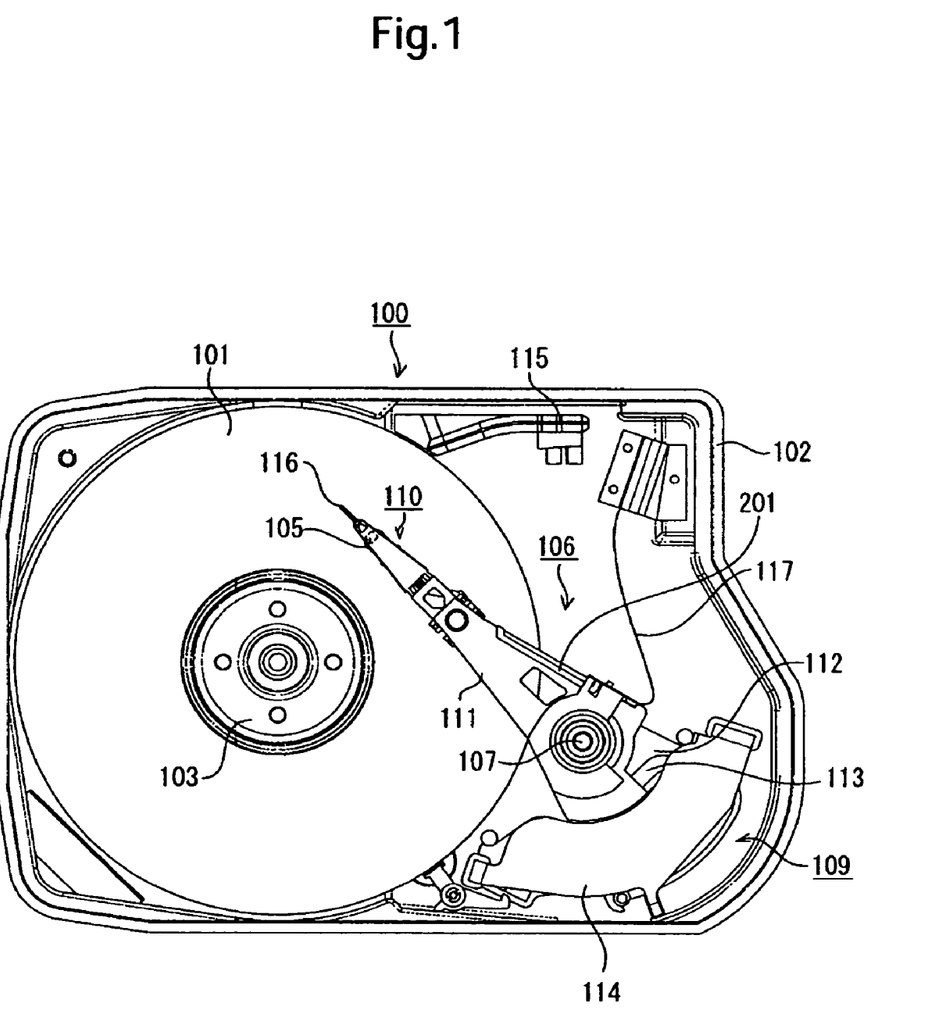
FIG. 1 is a schematic plan view showing the construction of a hard disk drive in an embodiment of the present invention.

At first, for ease of understanding of the present invention, a description will be given of the entire construction of a HDD. FIG. 1 is a schematic plan view showing the construction of a HDD 100 according to this embodiment. The HDD includes a magnetic disk 101 as a data recording medium. The magnetic disk 101 is a non-volatile memory which writes data by magnetization of a magnetic layer. The components of the HDD 100 are accommodated within a base 102. The base 102 is fixed through a gasket (not shown) to a cover (not shown) which closes an upper opening of the base 102, thereby constituting a disk enclosure which permits the components of the HDD 100 to be accommodated therein in a hermetically sealed state.

The magnetic disk 101 is fixed to a spindle motor (SPM) 103. A head slider 105 includes a head element portion which reads and/or writes data from and/or to the magnetic disk 101, the data being inputted and outputted between the head element portion and a host (not shown). The head element portion includes a write element and/or a read element, as well as a slider. The write element converts an electric signal to a magnetic field in accordance with data to be stored on the magnetic disk 101. The read element converts a magnetic field provided from the magnetic disk 101 into an electric signal. The write element and/or the read element are/is formed on a surface of the slider.

An actuator 106 holds and moves the head slider 105. The actuator 106 is pivotally held by a pivot shaft 107 and is driven by a VCM (voice coil motor) 109 as a drive mechanism. The actuator 106 has components including a suspension 110, an arm 111, a coil support 112 and a flat coil 113 joined together in this order from the longitudinal leading end thereof on which the head slider 105 is placed. The construction of the suspension 110 is detailedly described later. The VCM 109 is made up of the flat coil 113, a stator magnet (not shown) fixed to an upper stator magnet holding plate 114, and a stator magnet (not shown) fixed to a lower stator magnet holding plate.

The magnetic disk 101 is integrally held by the SPM 103 which is fixed to the bottom of the base 102, and is rotationally driven at a predetermined speed by the SPM 103. The magnetic disk 101 rotates counterclockwise in FIG. 1. While the HDD 100 is not in operation, the magnetic disk 101 is at rest. In accordance with a drive signal provided from a controller (not shown) to the flat coil 113 the VCM 109 causes the actuator 106 to pivot in its transverse direction about the pivot shaft 107. As a result, the actuator 106 can move the head slider 105 over the magnetic disk 101 or to the outside of the magnetic disk.

For read/write of data from/to the magnetic disk 101, the actuator 106 moves the head slider 105 to a position above a data area on the surface of the rotating magnetic disk 101. As the actuator 106 pivots, the head slider 105 moves radially over the surface of the magnetic disk 101 and can thereby access a desired track. The signal between the head slider 105 and the controller is transmitted by a trace 201 as transmission wiring and an FPC (flexible printed circuit) 117. The head slider 105 flies over the magnetic disk 101 at a certain gap by allowing pressure based on the viscosity of air present between an ABS (Air Bearing Surface) of the slider opposed to the magnetic disk 101 and the rotating magnetic disk to counteract pressure applied in the direction of the magnetic disk 101 by the suspension 110.

When the rotation of the magnetic disk 101 stops, the head slider 105 comes into contact with the surface of the magnetic disk 101, which will cause problems such as scratching of the data area due to an attractive phenomenon or inability of the magnetic disk to rotate. When the rotation of the magnetic disk 101 is about to stop, therefore, the actuator 106 causes the head 105 to withdraw from the data area to a ramp mechanism 115. The actuator 106 moves pivotally toward the ramp mechanism 115 and a tab 116 formed at the leading end of the actuator 106 moves while sliding on the surface of the ramp mechanism 115 and gets on a parking surface formed on the ramp mechanism, whereby the head slider 105 is unloaded. On the other hand, at the time of loading, the actuator 106 supported on the parking surface leaves the ramp mechanism 115 and moves to a position over the surface of the magnetic disk 101.

The present invention is applicable also to the CSS (Contact Start and Stop) method wherein the head slider 105 is withdrawn to a zone located on the inner periphery of the magnetic disk 101 when the head slider does not perform the data write/read processing. Although the hard disk drive described above is of a one-side storage type using a single magnetic disk 101 for simplification of explanation, the HDD 100 may be provided with one or plural magnetic disks of a both-side storage type.

As described earlier, the head slider 105 is subjected to a DET in its manufacturing process before being mounted to the HDD 100. In the DET, the head slider 105 is mounted to the suspension 110 to constitute an HGA, then the HGA is set to a testing device and actual read/write processing is performed on the rotating magnetic disk. In this way the head slider 105 is evaluated for flying characteristics and read/write characteristics.

Figure 2:
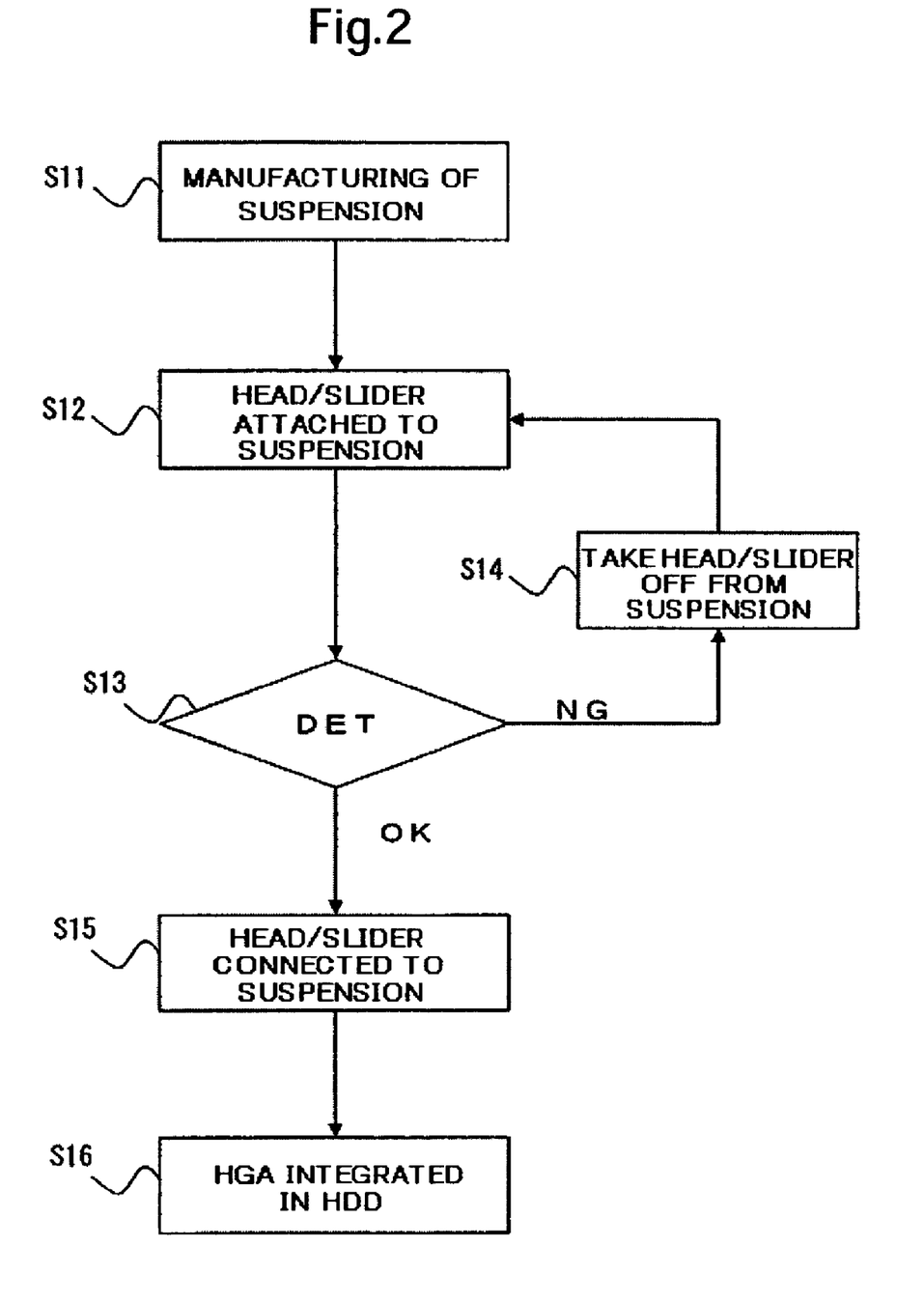
FIG. 2 is a flow chart illustrating a process for manufacturing a head gimbal assembly in the embodiment.

More specifically, as shown in the flow chart of FIG. 2, first the suspension 110 is fabricated (S11). Next, the head slider 105 is mounted to the prepared suspension 110 to constitute the HGA (S12). In this case, the head slider 105 is mounted to the suspension 110 removably. The holding mechanism of the suspension 110 for the head slider 105 will be described in detail later. The HGA thus constituted is set to a testing device for the DET (S13).

When the result of evaluation made in the DET of step S13 is "Error (Defective, NG)," the head slider 105 is removed from the suspension 110 and is discharged to waste (S14). The suspension 110 is re-used and another new head slider 105 is mounted to the suspension 110 (S12), followed by the DET (S13).

When the evaluation result in DET of S13 is "Pass (Good, OK)," the head slider 105 and the suspension 110 are connected to each other firmly (S15). More specifically, the head slider 105 and the suspension 110 are fixed together using an adhesive and terminal portions are connected to each other electrically and physically by, for example, solder ball bonding or gold ball bonding. Thereafter, the HGA is mounted to the HDD 100 as a product (S16).

Figure 3:
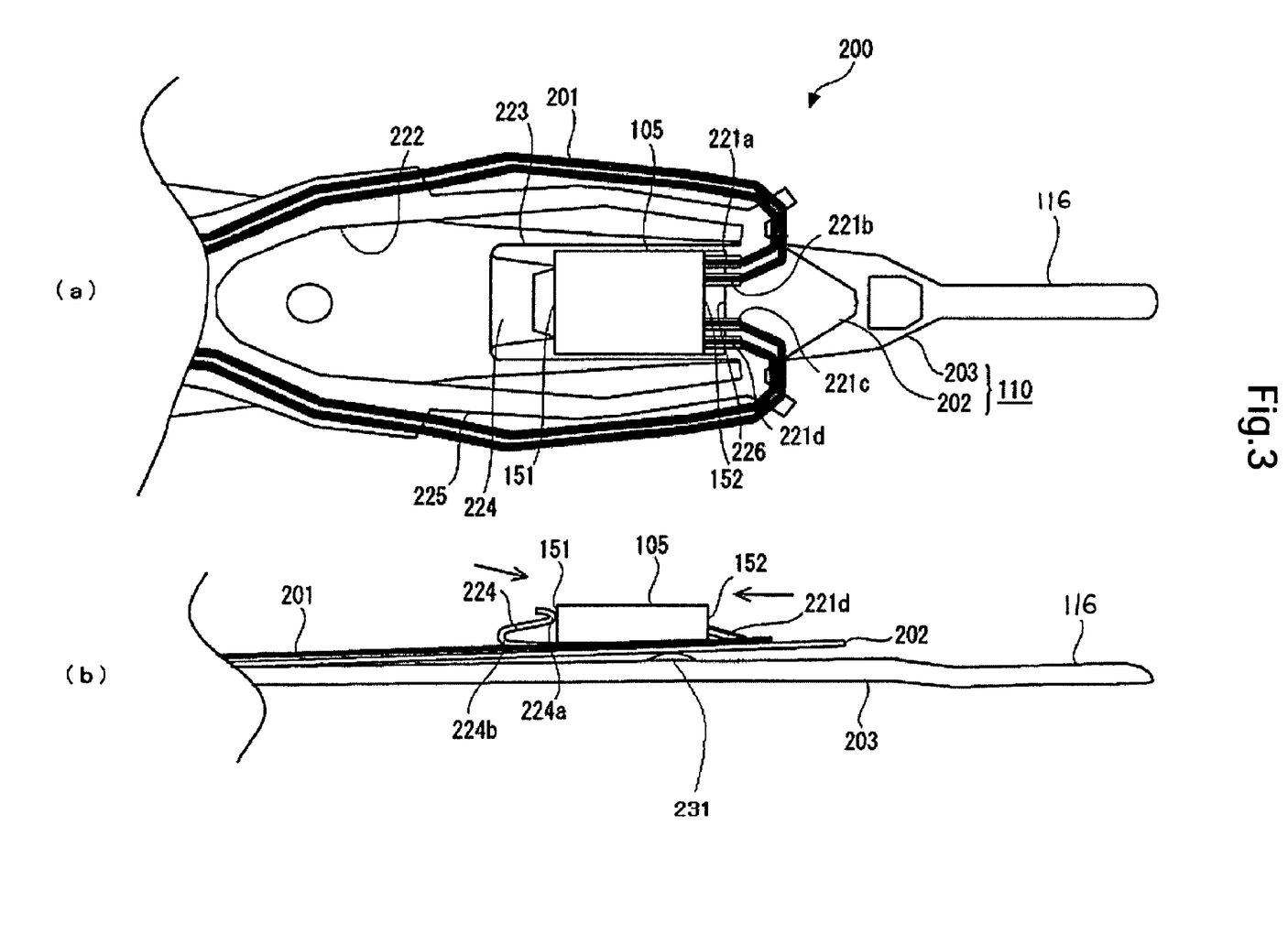
FIG. 3 schematically illustrates the construction of the head gimbal assembly in a DET according to one embodiment of the invention.

With reference to FIG. 3, a description will be given of the construction of an HGA 200 used in this embodiment. FIG. 3(a) is a plan view showing a partial construction of the HGA 200 which is in a state used in the DET and which is viewed from the side of the magnetic disk 101. FIG. 3(b) is a side view thereof. The portion not shown in FIG. 3 is of the same construction as that of the conventional HGA and therefore an explanation thereof will here be omitted. In this embodiment the HGA 200 is composed of a plurality of components, including the head slider 105, suspension 110 and a trace 201. The suspension 110 is composed of a plurality of components, including gimbal 202 and a load beam 203.

The trace 201 transmits a signal from the head element portion installed within the head slider 105. In the trace 201, a plurality of leads in no contact with one another are integrally formed on an insulating sheet of a polyimide film. FIG. 3 shows two leads for read and two leads for write. The number of the leads can be varied depending on the construction of the head slider 105. One end of the leads constitute a multi-connector (not shown) connected to an internal circuit such as a head amplifier. The other end of the leads on the side of the head slider 105 are connected to connecting terminals 221a to 221d which are formed on the gimbal 202. The trace 201 is fixed to the gimbal 202 with an adhesive or the like or is continuously formed integrally with the gimbal 202. Where required, the trace 201 is covered on its exterior with an epoxy resin, for example.

The load beam 203 is formed of stainless steel or the like and functions as a precise thin sheet spring. The shape of the load beam 203 is ingeniously formed to extend long perpendicularly to the pivotal direction, to be thin and light-weight and to maintain the required rigidity (higher than that of the gimbal 202). The tab 116 is formed at the longitudinal leading end, i.e., on the longitudinal front side (on a side opposite to the pivot shaft 107), of the load beam 203. The load beam 203 has elasticity, which generates a load counteracting the lifting force of the head slider 105. The load counteracts the lifting force of the head slider 105 to allow the head slider 105 to fly at a desired height.

The gimbal 202 is welded to the load beam 203 on the surface side of the magnetic disk 101 by laser spot welding. For example, the gimbal 202 can be formed of stainless steel. The gimbal 202 has a desired elasticity and is formed deformable so that the head slider 105 can tilt in a predetermined direction to absorb surface vibration or the like of the magnetic disk 101. The gimbal 202 is formed at its front portion with an aperture 222. Centrally of one front side (the tab 106 side) of the aperture 222 is formed a tongue piece-like gimbal tongue 223 which projects to the center of the aperture 222. The head slider 105 is disposed on the gimbal tongue 223 projecting from one front side of the aperture 222 toward the rear side (leading side of the head slider 105). The head slider 105 is held by a resilient clamp 224 and a connecting terminal 221 (221a-221d) which are formed in the gimbal 202. A holding mechanism for the head slider 105 will be described in detail later.

The gimbal 202 is welded at a rear portion (not shown) thereof to the load beam 203, while the front portion thereof, including a gimbal arm 225 and the gimbal tongue 223, is not welded, that is, is in a free state. Two gimbal arms 225 extending along the side ends of the aperture 222 from the rear portion of the gimbal 202 define an end of the aperture 222. In addition, the gimbal arms 225 elastically support the gimbal tongue 223 which is formed at front portions of the gimbal arms 225 to be contiguous thereto. Unlike the illustrated construction, the gimbal 202 and the load beam 203 may be formed as an integral member, not separate members.

As shown in FIG. 3(b), the load beam 203 is formed, at a position thereof opposed to the head slider 105, with a dimple 231 which is raised toward the gimbal 202 (toward the head slider 105 (upward in the drawing)). The gimbal tongue 223 is supported at one point by the dimple 231 of the load beam 203. The gimbal arms 225 are such in a warped state that the elastic force thereof pushes the gimbal tongue 223 against the dimple 231. The gimbal tongue 223 can pivotally move the head slider 105 in the pitching or rolling direction so that it can absorb surface vibration of the magnetic disk 101 and tilting resulting from the assembly, and so that it can exhibit high follow-up performance in tracking of the magnetic disk 101.

As described above, the head slider 105 is removably held on the gimbal tongue 223. The clamp 224, which has a bent portion and possesses resilience, is provided at a rear end of the gimbal tongue 223, i.e., on the leading side of the head slider 105. The resilient clamp 224 is formed in opposition to the leading-side surface 151 of the head slider 105. The resilient clamp 224 comes into abutment against the leading-side surface 151 to push it forward (to the trailing side of the head slider 105) and also toward the gimbal tongue 223. That is, the urging force acts obliquely relative to the surface of the gimbal tongue 223 on which the head slider 105 is disposed.

The connecting terminal 221 supports the head slider 105 so as to resist the urging force of the resilient clamp 224. That is, the head slider 105 is held between the resilient clamp 224 and the connecting terminals 221 by their urging forces. As noted above, the urging force of the resilient clamp 224 contains a component acting in the direction in which the head slider 105 is urged against the gimbal tongue 223. Thus, the head slider 105 is held also by the urging force exerted between the head slider 105 and the gimbal tongue 223. By urging the head slider 105 against the gimbal tongue 223 through the resilient clamp 224, the head slider 105 can be fixed on the gimbal tongue 223 more positively.

Four terminals (not shown in FIG. 3) are formed on a front surface, i.e., a trailing-side surface 152, of the head slider 105 which is on the side opposite to the resilient clamp 224. The terminals are connected to the head element portion. The connecting terminals 221 of the gimbal 202 are each in contact with corresponding one of the terminals of the head slider 105. The gimbal 202 is formed with an aperture 226 in front of the trailing-side surface 152, and the connecting terminals 221 are formed so as to project over the aperture 226. The connecting terminals 221 also function as stoppers to effect positioning of the head slider 105 on the gimbal tongue 223. That is, to make accurate evaluation of characteristics, it is important that the head slider 105 be subjected to positioning relative to the dimple 231, and the connecting terminals 221 perform this positioning.

Preferably, the resilient clamp 224 is formed on the leading side of the head slider 105, as shown in FIG. 3. The resilient clamp 224 is formed on the longitudinal side of the suspension 110 relative to the head slider 105, that is, it is formed in abutment against the leading side surface 151 extending in the transverse direction of the suspension 110. Thus, it is possible to form the resilient clamp 224 without increasing the transverse width of the suspension 110. Moreover, since the connecting terminals 221 for signal transmission are not present on the leading side of the head slider 105, unlike the trailing side, it is possible to easily form the clamp in a required shape. More preferably, the resilient clamp 224 is formed by bending the rearward extending portion of the gimbal tongue 223, whereby the resilient clamp can be easily formed by press working without using any separate member.

In FIG. 3, the resilient clamp 224 has two bent portions 224a and 224b, of which the bent portion 224a is in abutment against the leading-side surface 151 of the head slider 105. Such linear contact of the resilient clamp 224 with the head slider 105 permits uniform application of the urging force. The other bent portion 224b, which is formed by bending the rear end portion of the gimbal tongue 223 toward the head slider 105, mainly creates the resilience of the resilient clamp 224. The portion between the bent portions 224a and 224b is a flat plate-like portion and has a predetermined inclination angle relative to the gimbal tongue 223 so as to create an urging force against the gimbal tongue 223. This structure of the resilient clamp 224 is preferred in that not only the required urging force is obtained but also machining is easy.

Figure 4:
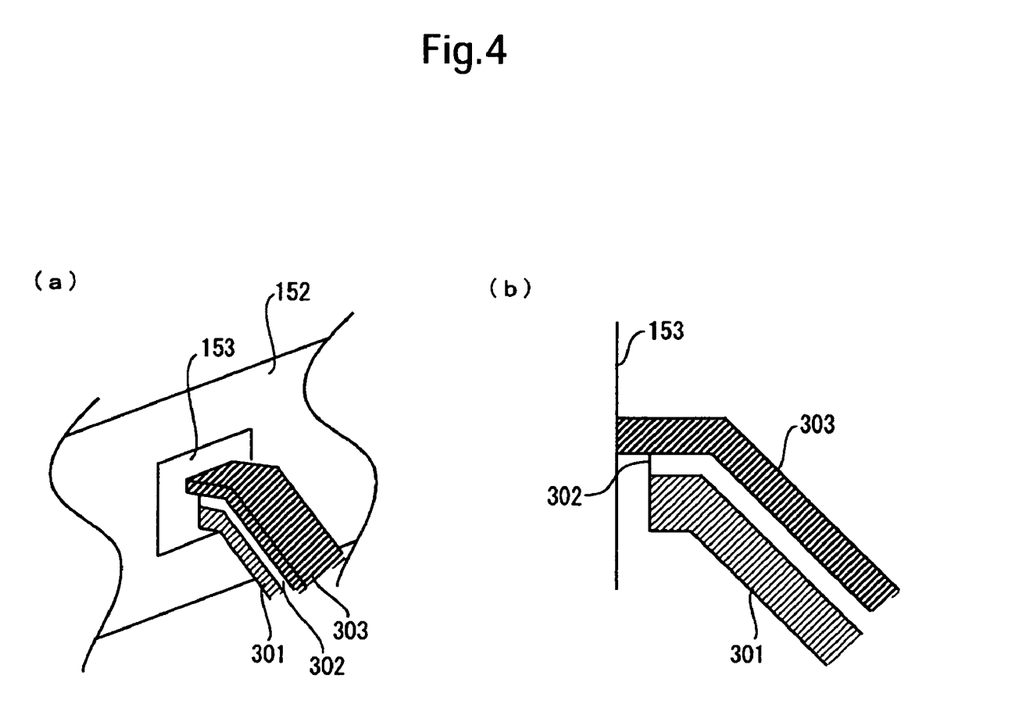
FIG. 4 schematically illustrates a connection structure between a connecting terminal of a gimbal and a terminal of a head slider in an embodiment.

FIGS. 4(a) and 4(b) schematically show how one of the terminals 153 of the head slider is connected to a corresponding one of the connecting terminals 221. The connecting terminal 221 is composed of plural layers, including a gimbal layer 301 as a bottom layer, an insulating layer 302 formed of, e.g., polyimide, which overlies the gimbal layer 301, and a conductive layer 303 as a top layer. The conductive layer 303 is formed of metal such as copper. The conductive layer 303 is in contact under pressure with the slider terminal 153, whereby electrical connection between them is ensured. Since the conductive layer 303 projects from both the gimbal layer 301 and insulating layer 302, the gimbal layer 301 can be spaced away from the head slider terminal 153.

Figure 5:
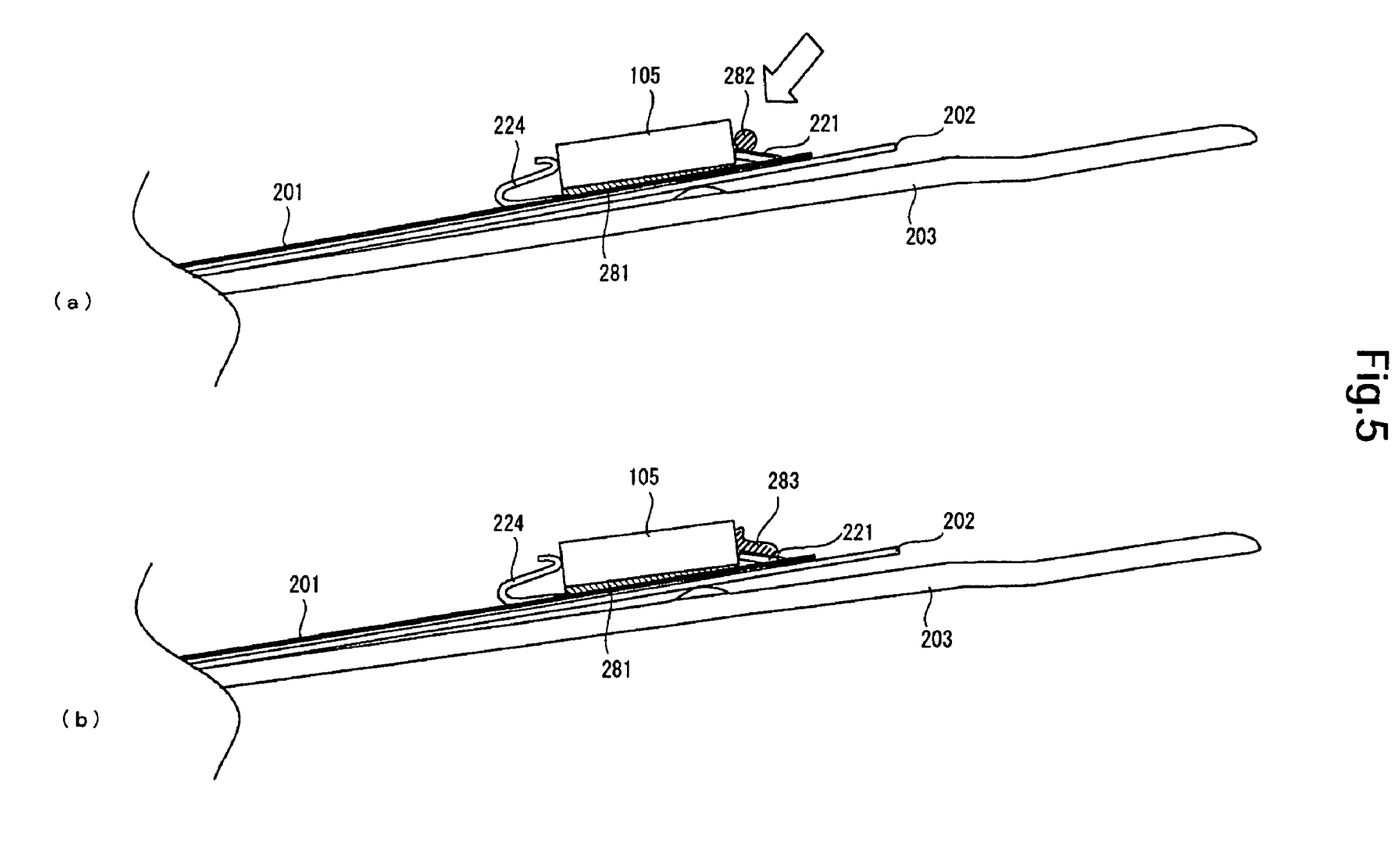
FIG. 5 schematically illustrates a firm connection of the head slider for mounting to HDD in an embodiment.

In the DET, as shown in FIG. 3, the head slider 105 is held on the gimbal tongue 223 with only the urging force developed by the resilient clamp 224. As described above in connection with FIG. 2, when the evaluation result in the DET passes it, the head slider 105 is connected firmly (S15). FIG. 5 schematically shows a method of connecting the head slider 105 firmly. As shown in FIG. 5(a), the head slider 105 is fixed at its bottom to the surface of the gimbal tongue 223 through an adhesive layer 281. Typically, both are fixed together with a low elastic epoxy resin.

Further, the connecting terminal 221 and the head slider terminal 153 are connected to each other by solder ball bonding or gold ball bonding. More specifically, as shown in FIG. 5(a), a conductor ball 282 formed of solder or gold is disposed between the connecting terminal 221 and the head slider terminal 153 and a laser beam is applied to the conductor ball. As a result, the conductor ball melts to form a conductor layer 283 which connects the connecting terminal 221 and the head slider terminal 153 electrically and physically as shown in FIG. 5(b).

By thus connecting the head slider 105 physically or electrically through the adhesive layer 281 and/or the conductive layer 283, it is ensured that the head slider 105 can be held or electrically connected after the mounting thereof to the HDD 100. In the case where a sufficient holding force can be obtained by the urging force of the resilient clamp 224, the HGA 200 can be mounted to the HDD 100 without using the adhesive layer 281 or the conductive layer 283.

Figure 6:
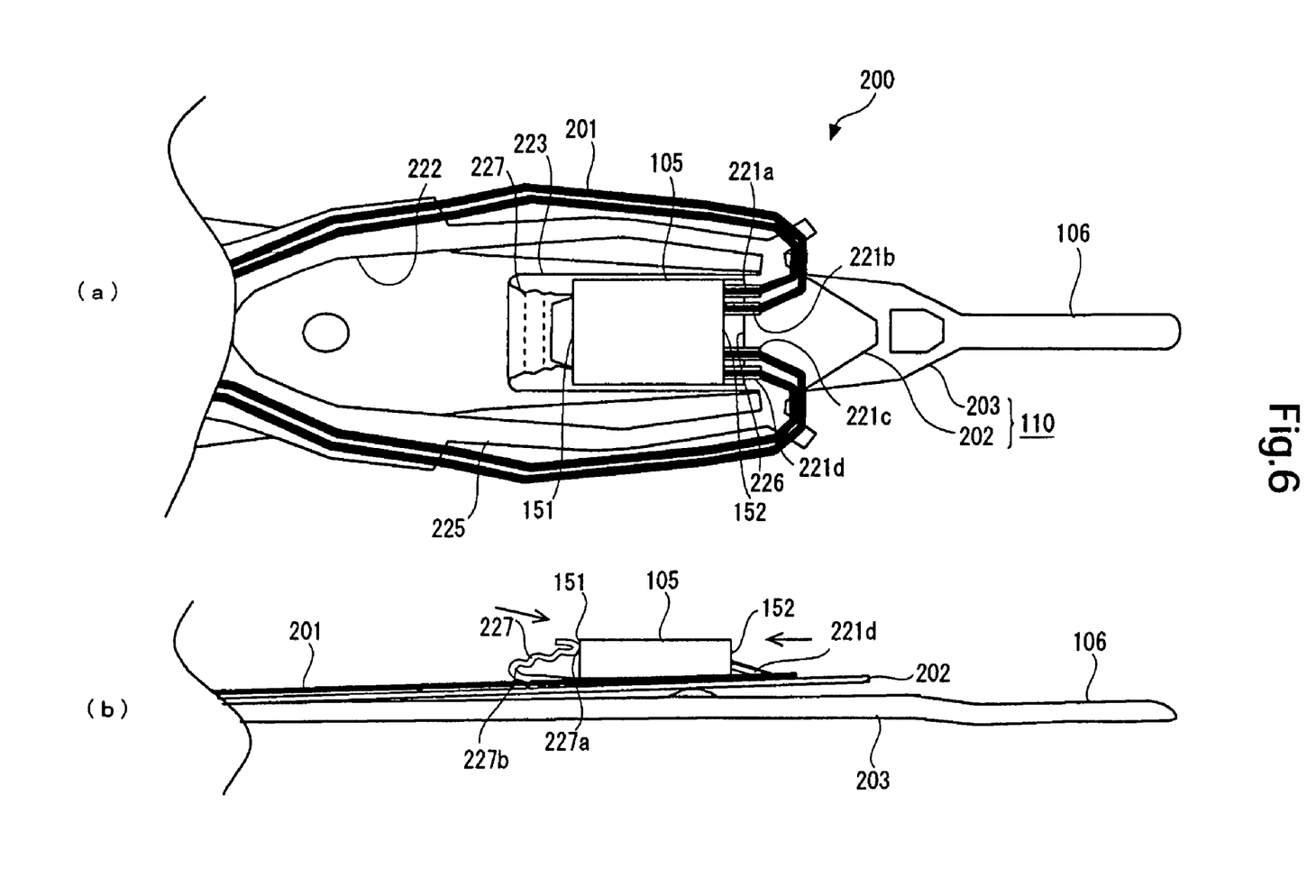
FIG. 6 schematically illustrates the construction of a head gimbal assembly according to another embodiment of the invention.

FIG. 6 shows a resilient clamp according to another embodiment. In the figure, the construction is the same as the HGA 200 shown in FIG. 3 except for the resilient clamp 227 and therefore an explanation thereof is here omitted. The resilient clamp 227 has a plurality of bent portions which create resilience. More specifically, the plurality of bent portions are formed between a bent portion 227a and a bent portion 227b. The bent portion 227a is in abutment against the leading-side surface 151 of the head slider 105. The bent portion 227b is formed by bending the rear end portion of the gimbal tongue 223 toward the head slider 105 and is located remotest from the head slider 105. According to this construction, the head slider 105 can be held in a more positive manner.

Figure 7:
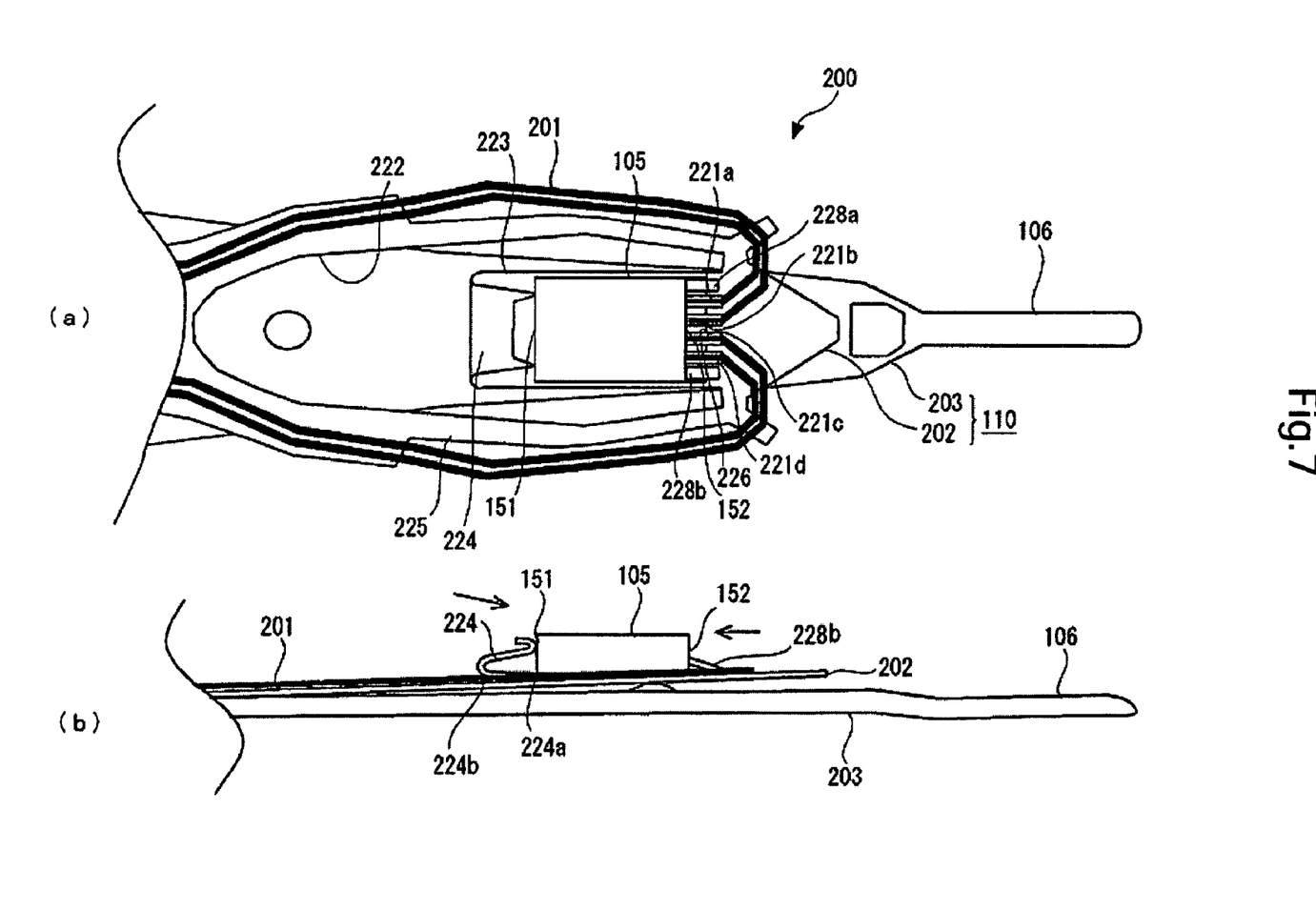
FIG. 7 schematically illustrates the construction of a head gimbal assembly according to a further embodiment of the invention.

FIG. 7 shows a holding mechanism according to another embodiment. Although in the embodiment of FIG. 3 the connecting terminals 221 position the head slider 105, it is one of the preferred embodiments to use stoppers 228a and 228b which position the head slider 105, as shown in FIG. 7. The stoppers 228 (228a, 228b) project toward the trailing-side surface 152 of the head slider 105 and is in slant abutment against the trailing side surface 152. On the side opposite to the resilient clamp 224 the stoppers 228 come into abutment against the head slider 105 to position the head slider.

In the embodiment shown in FIG. 7, the stoppers 228 are formed on both outsides of the row of the connecting terminals 221. By providing the stoppers 228 separately from the connecting terminals 221 it is possible to suppress wear of the connecting terminals 221 and a positional deviation of the head slider 105 caused by the wear even if the mounting and removal of the head slider 105 are repeated. The stoppers 228 can be each formed by machining part of the gimbal 202 to form a projecting portion toward the head slider 105 and bending the projecting portion by press working. To position the head slider it is preferable to form a plurality of stoppers 228. When the stoppers 228 are formed, it is preferred that the connecting terminals 221 have resilience. By so doing, it is possible to not only ensure an electrical connection between the connecting terminals 221 and the head slider terminal 153 but also diminish the force exerted on the connecting terminals 221 and diminish wear of the connecting terminals 221.

It is preferable that the HGA tested as in the above embodiment be mounted as it is to the HDD, but the suspension described above may be used as a suspension for the DET. In this case, after the end of the DET, the head slider is removed from the suspension and is mounted to a suspension product to be mounted to the HDD. The suspension product may be of the same construction as the conventional suspension. As a result, not only the head slider can be fixed positively in the test, but also it is possible to replace a defective head slider easily without discharging the suspension to waste. Further, the suspension of this embodiment is employable also in evaluating the head slider in a ferromagnetic field, in studying a transmission line of the suspension and in studying a mechanical vibration.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A suspension for holding a head slider having a head element portion and adapted to fly over a rotating medium, said suspension comprising:
   a load beam which applies to said head slider a force that counteracts a lifting force of the head slider; and
   a flexible gimbal fixed onto a surface of said load beam, said gimbal including a tongue adapted to dispose said head slider thereon and a resilient clamp adapted to urge and hold the head slider on said tongue;
   wherein said gimbal includes, on the side opposite to said clamp and separately from said head slider, at least one stopper which comes into abutment against said head slider to position the head slider and at least one electrically connecting terminal separate from the stopper.

2. A suspension according to claim 1, wherein said clamp confronts and abuts a leading-side surface of said head slider oriented away from the load beam to apply an urging force to the head slider.

3. A suspension according to claim 2, wherein said clamp is formed by bending a portion extending from said tongue on the leading side of said head slider.

4. A suspension according to claim 2, wherein said electrically connecting terminal comes into contact with a terminal of said head slider to connect transmission wiring and said terminal.

5. A suspension according to claim 4, wherein said connecting terminal comes into abutment against the terminal of said head slider.

6. A head gimbal assembly comprising:
   a head slider including a head element portion;
   a flexible gimbal, said gimbal including a tongue on which said head slider is disposed and a resilient clamp adapted to urge and hold said head slider on said tongue; and
   a load beam which holds said gimbal on the side opposite to said head slider;
   wherein said gimbal includes, on the side opposite to said resilient clamp, at least one stopper which comes into abutment against said head slider to position the head slider and at least one electrically connecting terminal separate from the stopper.

7. A head gimbal assembly according to claim 6, wherein said clamp confronts and abuts a side face of said head slider which side face extends in a transverse direction of the load beam, and applies an urging force to the head slider.

8. A head gimbal assembly according to claim 7, wherein said clamp confronts and abuts a leading-side surface of said head slider oriented away from the load beam and applies an urging force to the head slider.

9. A head gimbal assembly according to claim 8, wherein said clamp is formed by bending a portion extending from said tongue on the leading side of said head slider.

10. A head gimbal assembly according to claim 8, wherein said electrically connecting terminal is connected to transmission wiring and comes into contact with a terminal of said head slider.

11. A head gimbal assembly according to claim 10, wherein said connecting terminal comes into abutment against the terminal of said head slider.

12. A head gimbal assembly according to claim 7, further comprising an adhesive layer formed between said head slider and said tongue.

13. A head gimbal assembly according to claim 10, further comprising a conductor layer for fixing the terminal of said head slider to said connecting terminal.

14. A method of manufacturing a head gimbal assembly comprising a head slider provided with a head element portion and a suspension for holding the head slider, said method comprising:
   providing a suspension comprising a load beam and a flexible gimbal fixed onto said load beam;
   disposing a head slider onto a tongue surface of said gimbal and urging and holding said head slider on said tongue surface by use of a resilient clamp formed in said gimbal;
   providing at least one stopper on the opposite side of said resilient clamp to position the head slider;
   providing at least one electrically connecting terminal separate from the stopper and on the opposite side of said resilient clamp, said electrically connecting terminal comes into electrical contact with a terminal of said head slider to electrically connect transmission wiring and said terminal;
   making access to a rotating medium through said head slider held by said suspension, thereby testing electrical characteristics of said head slider; and
   removing said head slider if proved to be defective from said suspension and disposing a new head slider on said suspension.

15. A method according to claim 14, wherein, if the result of the test of said head slider is good, the head slider and the tongue of said gimbal are fixed together using an adhesive.

16. A method according to claim 14, wherein, when the result of the test of said head slider is good, a terminal of said head slider and a connecting terminal of said suspension are fixed together using a conductor.

17. A method according to claim 14, wherein, if the result of the test of said head slider is good, the head slider is removed from said suspension and is mounted on another suspension product.

18. A method according to claim 14, wherein said clamp confronts and abuts a leading-side surface of said head slider oriented away from the load beam to apply an urging force to the head slider.

* * * * *